United States Patent [19]
Sasaki et al.

[11] Patent Number: 5,747,400
[45] Date of Patent: May 5, 1998

[54] METHOD OF DRYING LINING REFRACTORY MATERIAL FOR INSTRUMENT/APPARATUS

[75] Inventors: Tadao Sasaki, Takarazuka; Hideaki Ohashi, Toyota; Akio Ueda, Seto; Norio Honda; Hiroyuki Suzuki, both of Toyota, all of Japan

[73] Assignee: Nippon Crucible Co., Ltd, Japan

[21] Appl. No.: 683,783

[22] Filed: Jul. 16, 1996

[30] Foreign Application Priority Data

Oct. 28, 1995 [JP] Japan ................................. 7-303604

[51] Int. Cl.$^6$ .................................................. C04B 35/00
[52] U.S. Cl. ........................... 501/94; 501/108; 501/109; 501/127; 501/130; 427/8
[58] Field of Search ............................. 501/94, 108, 109, 501/127, 130; 427/8

[56] References Cited

U.S. PATENT DOCUMENTS

| | | | |
|---|---|---|---|
| 4,319,925 | 3/1982 | Brown | 501/105 |
| 4,342,597 | 8/1982 | Brown | 501/105 |

*Primary Examiner*—Karl Group
*Attorney, Agent, or Firm*—Barnes & Thornburg

[57] ABSTRACT

A colored refractory material for lining an instrument/apparatus used at a high temperature is formed by mixing a powder of a raw material containing ceramics with a coloring agent and kneading with a liquid using a binder. The refractory material is put in lining for a portion being in contact with a high temperature molten substance or being exposed to a high temperature atmosphere, and is dried by heating while adjusting a temperature and a heating time on the basis of color change on the surface of the refractory material.

10 Claims, 3 Drawing Sheets

METHOD OF DRYING LINING REFRACTORY MATERIAL FOR INSTRUMENT/APPARATUS

BACKGROUND OF THE INVENTION

1. Field of the Invention

The present invention relates to a lining refractory material used in lining for a portion being in contact with a high temperature molten substance or being exposed to a high temperature atmosphere, of an instrument or apparatus used at high temperatures (hereinafter referred to simply as "instrument/apparatus"), for example, a main body or an additional trough, ladle, lid, draft, duct or boiler of a furnace such as a blast furnace for melting or processing metal, glass, cement, slug, industrial waste and the like, a cupola, a melting/holding furnace for aluminum and other non-ferrous metals, a soaking/heating furnace, an electric induction heating furnace of a groove type or a pot type, an incinerator, a cement kiln, or a glass melting furnace; and a method of drying the refractory material.

2. Description of the Related Art

A related art lining refractory material is obtained by kneading a powder of a raw material mainly containing ceramics with a liquid such as water using a binder such as a cement, a phosphate or a silicate. The refractory material or one further shaped to have a cubic form of a particular size is put in lining for a portion of an instrument/apparatus being in contact with a high temperature substance or being exposed to a high temperature atmosphere, and dried by heating for removing water or gas contained in the refractory material.

In the case where the material put in lining is heated for drying, it tends to be ruptured if the temperature is rapidly increased. The rapture of the material causes problems in that it damages an operator or leads to separation or clacking of the material to the degree that the material cannot be used. On the other hand, if the temperature is excessively low, water and gas remains in the material. Such a material is possibly ruptured in the stage of using the material and damages an operator or the ruptured material leads to separation or clacking of the material to the degree that the material cannot be used.

A method of checking changes in temperature by means of thermocouples mounted on several points of a lining material has been known. In this method, however, the thermocouple mounting points are limited to those being safe and easy in mounting, and thereby this method fails to sufficiently check changes in temperature in the interior of the material and is disadvantageous in increasing the cost because the thermocouples are used as consumable supplies.

Accordingly, in most cases, the checking of temperature change is dependent on the perception of an operator. In this case, however, the education for a person skilled in the art takes years and months, and even a skilled operator has a difficulty in managing the heating temperature and time depending on the shape, thickness, size and the like of a lining material.

SUMMARY OF THE INVENTION

A purpose of the present invention is to provide a method of drying a lining refractory material wherein changes in its internal temperature are checked from the outside on the basis of changes in color of the refractory material due to heating, and to provide a lining refractory material used for the method.

To accomplish these and other purposes, the present invention provides a lining colored refractory material for lining of an instrument/apparatus used at a high temperature for a high temperature molten substance or a high temperature atmosphere, wherein the refractory material is formed by mixing a powder of a raw material containing ceramics with a coloring agent, and kneading the powder with a liquid using a binder.

Preferably, the coloring agent is an organic pigment, an inorganic pigment, or a colored synthetic resin. In one embodiment of the invention, the liquid is water. A cement, a phosphate or a silicate may be used as the binder.

According to another aspect of the invention, a method of drying a lining refractory material for lining of an instrument/apparatus used at a high temperature for a high temperature molten substance or a high temperature atmosphere, is provided. The method comprises the step of preparing a colored monolithic refractory material by mixing a powder of a raw material containing ceramics with a coloring agent, and kneading said powder with a liquid using a binder. A portion of an instrument/apparatus which is in contact with a high temperature molten substance or exposed to a high temperature atmosphere, is covered with the refractory material. The refractory material is then heated. A tone of the refractory material, varying with an increase in heating temperature, is visually observed for adjusting the heating temperature and heating time on the basis of the observed tone, thereby allowing moisture and gas contained in the refractory material to be evaporated.

In one embodiment of the invention, the monolithic refractory material is applied to the portion for covering. In another embodiment, the method further comprises the step of shaping the colored monolithic refractory material in a mold prior to the covering step. The shaped refractory material is then used for covering.

The changes in color only on the surface of the refractory material can be visually observed. Therefore, data on a relationship between a surface temperature and an internal temperature and on a relationship between a temperature and a surface hue are previously obtained by experiments for each composition and thickness of the refractory material. On the basis of such data, the refractory material is sufficiently heated until the internal temperature reaches a value allowing moisture or gas contained in the refractory to be evaporated, by adjusting a rising timing of the heating temperature and heating time in each color change stage through visual observation of the color change on the surface.

DESCRIPTION OF THE PREFERRED EMBODIMENTS

Figure 1:
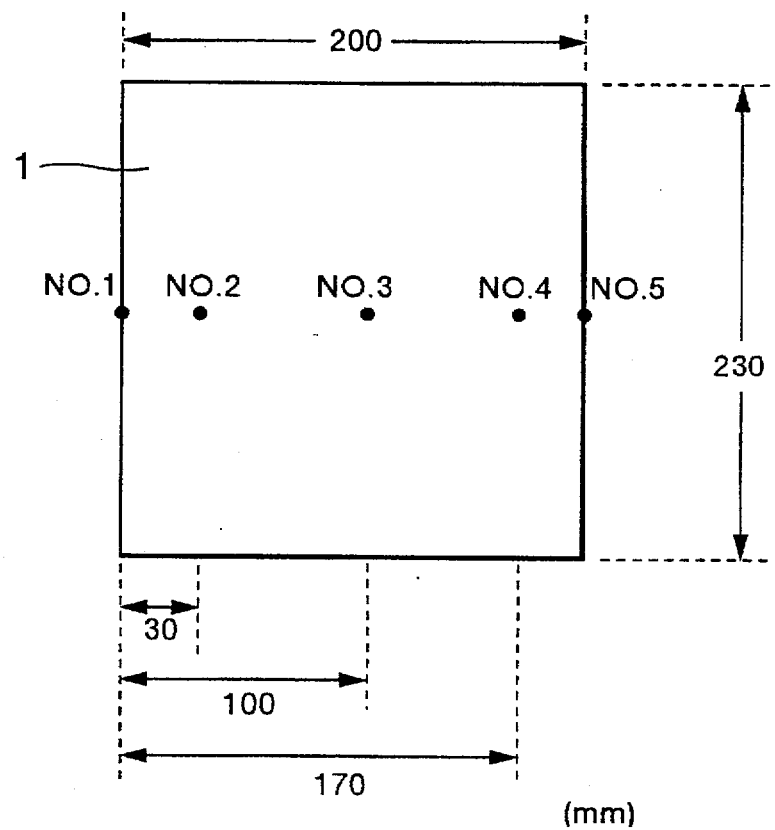
FIG. 1 is a view illustrating mounting positions of thermocouples for obtaining data on changes in temperature of a refractory material.

A powder of a raw material mainly containing ceramics is added with a coloring agent such as an organic pigment, an inorganic pigment or a colored synthetic resin, and is kneaded with a liquid such as water using a binder such as a cement, a phosphate or a silicate, to form a refractory material colored in a suitable color such as yellow, red, green or blue.

The refractory material in a monolithic or a shaped form is put into lining for a portion of an instrument/apparatus being in contact with a high temperature molten substance such as molten metal or being exposed to a high temperature atmosphere in accordance with the size and shape of the portion by a known construction method, for example, ramming using a rammer, vibrating casting using a vibrator, enforcing by a hand, or coating by a trowel.

When the refractory material is heated, the coloring agent such as a pigment or a colored synthetic resin is changed in color and finally in white with an increase in temperature.

During the change in color, the tone is changed depending on the kind of a coloring agent such as a pigment or a colored synthetic resin. For example, the change in tone depending on a coloring agent is as follows:

Refractory Material I

<Composition of Raw Material>

100 weight part ceramic powder is prepared by adding to 64 weight part mullite, 27 weight part alumina, 3 weight part silica and 6 weight part clay. To the above 100 weight part of ceramic powder, 14 weight part solution of aluminum phosphate and 0.08 weight part Brilliant Fast Scarlet (organic pigment) are added. (The total weight becomes 114.08.)

<Tone in Color Change>

| room temperature | red |
|---|---|
| 110° C. | slightly light red |
| 300° C. | black |
| 400° C. | slightly light black |
| 600° C. | white |

Refractory Material II

<Composition of Raw Material>

100 weight part ceramic powder is prepared by adding to 92 weight part alumina, 8 weight part clay. To the above 100 weight part of ceramic powder, 16 weight part solution of aluminum phosphate, 0.09 weight part Benzidine Yellow (organic pigment) are added.

<Tone in Color Change>

| room temperature | yellow |
|---|---|
| 110° C. | slightly light yellow |
| 300° C. | deep gray |
| 400° C. | slightly light deep gray |
| 600° C. | white |

Refractory Material III

<Composition of Raw Material>

100 weight part ceramic powder is prepared by adding to 32 weight part alumina, 32 weight part mullite, 30 weight part silicon carbide and 6 weight part clay. To the above 100 weight part of ceramic powder, 15 weight part solution of aluminum phosphate, 0.04 weight part Phthalocyanine Blue (organic pigment), and 0.04 weight part Benzidine Yellow (organic pigment) are added.

<Tone in Color Change>

| room temperature | green |
|---|---|
| 110° C. | slightly light green |
| 300° C. | black |
| 400° C. | slightly light black |
| 600° C. | ash gray |

Refractory Material IV

<Composition of Raw Material>

In the formula of preparing the above refractory material I, the solution of aluminum phosphate is replaced with 10 weight part water.

<Tone in Color Change>

| room temperature | red |
|---|---|
| 110° C. | slightly light red |
| 300° C. | gray |
| 400° C. | slightly light gray |
| 600° C. | white |

Refractory Material V

<Composition of Raw Material>

100 weight part ceramic powder is prepared by adding to 75 weight part chamotte, 20 weight part silicon carbide, 2 weight part clay and 3 weight part silica. To the above 100 weight part of ceramic powder, 8 weight part alumina cement, 9 weight part water and 0.09 weight part Phthalocyanine Blue(organic pigment) are added.

<Tone in Color Change>

| room temperature | blue |
|---|---|
| 110° C. | slightly light blue |
| 300° C. | deep grey |
| 400° C. | slightly light deep grey |
| 600° C. | ash grey |

When the refractory material is heated, the temperature is transmitted from the surface to the interior; however, the inner temperature differs depending on the thickness of the refractory material.

Figure 2:
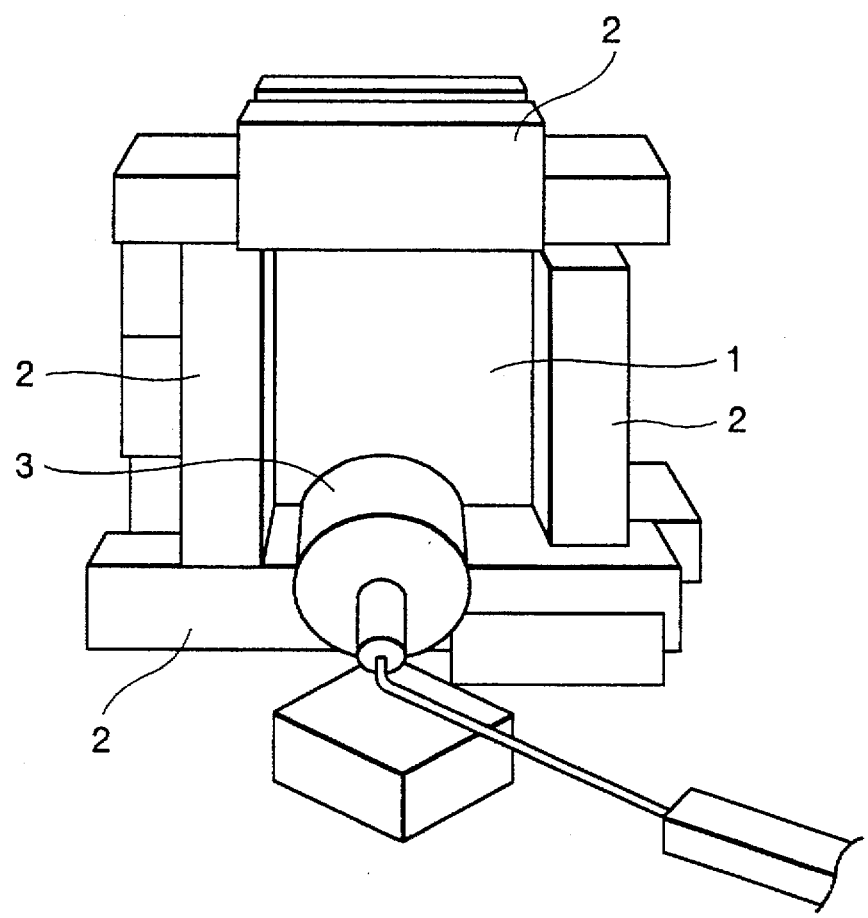
FIG. 2 is a view illustrating a method of heating a refractory material.

For this reason, thermocouples (No. 1 to No. 5) were mounted at one point on each of the front and back surfaces and at three points in the interior of the refractory material having a thickness of 20 cm, as shown in FIG. 1. The refractory material I was heated by a burner 3 in a state in which the upper and lower surfaces and the right and left side surfaces were covered with bricks 2, as shown in FIG. 2.

The changes in temperature at the thermocouple mounting points of the refractory material I are as shown in Table 1.

TABLE 1

| | | Temperatures (°C.) | | | | | | | | | |
|---|---|---|---|---|---|---|---|---|---|---|---|
| Thermo-couples' Location | | | | | | | | | | | |
| | distances from the surface | | | | | Heating Time (Hrs) | | | | | |
| No. | (mm) | 0 | 1 | 1 | 2 | 3 | 4 | 5 | 6 | 7 | 8 |
| 1 | 0 | 23 | 130 | 250 | 316 | 370 | 504 | 583 | 604 | 720 | 744 |
| 2 | 30 | 23 | 50 | 78 | 98 | 118 | 177 | 248 | 302 | 399 | 467 |
| 3 | 100 | 23 | 40 | 55 | 73 | 88 | 95 | 103 | 135 | 193 | 278 |
| 4 | 170 | 23 | 30 | 44 | 67 | 69 | 76 | 85 | 91 | 105 | 122 |
| 5 | 200 | 23 | 28 | 39 | 55 | 65 | 75 | 83 | 90 | 103 | 119 |

Figure 3:
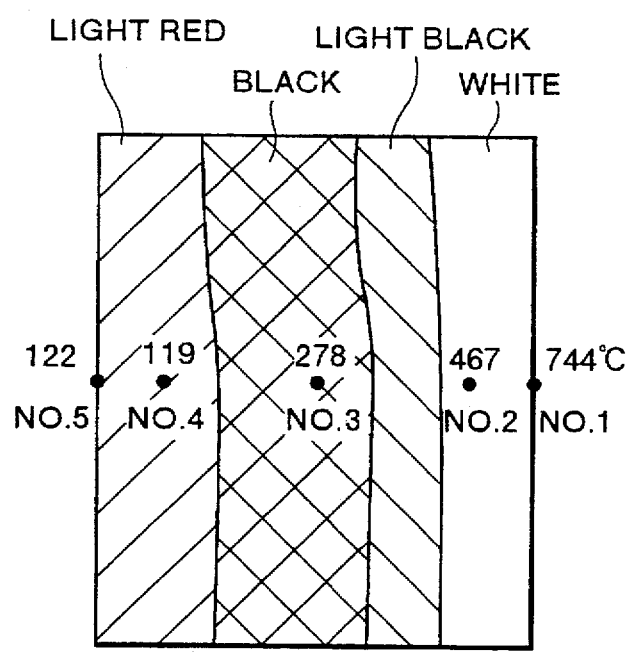
FIG. 3 is a view illustrating changes in tone of a refractory material due to heating.

The results of the heating test for the refractory material I using Brilliant Fast Scarlet as the organic pigment are shown in FIG. 3. As seen from this figure, it is revealed that the front heating surface may be heated at about 740° C. for allowing the opposite surface to the heating surface, that is, the surface where the thermocouple No. 5 is mounted to reach a temperature at which moisture and gas in the refractory material I are sufficiently evaporated, that is, about 120° C.

It is to be noted that the boundary between the adjacent tones is clearly indicated; however, the tone is, actually, continuously changed.

The above results show that the color of the heating surface of the refractory material I is changed from red to a slightly light red at about 110° C.; the slightly light red color is gradually blackened, and changed to deep black at about 300° C.; and the black color is gradually thinned from 400° C., and changed to white at about 600° C. The results also show that after an elapse of about 50 minutes since the temperature of the front heating surface reaches about 740° C., the temperature of the back surface reaches a value in a range of from about 110° to 120° C., that is, a temperature where moisture and gas are can be sufficiently removed.

From the above data, the temperature change in the interior and the back surface can be estimated by visual observation of the color change on the front surface, to thereby adjust an increase in the heating temperature on the basis of the color change on the front surface.

When the front surface temperature is rapidly increased up to about 740° C., the refractory material I is ruptured. To prevent such rupture, the temperature may be gradually increased by way of the above color change. The heating, preferably, takes a period of time ranging from 8 to 8.5 hours.

The hue of the refractory material can be suitably adjusted depending on the kind and amount of a coloring agent used, such as an organic pigment, an inorganic pigment or a colored synthetic resin, as easily seen from the examples of the refractory materials I to V.

As described above, the refractory material of the present invention is mixed with a coloring agent such as a pigment or a colored synthetic resin, to be colored in a suitable color such as yellow, red, green or blue. Such a refractory material is put in lining for a portion of an instrument/apparatus being in contact with a high temperature molten substance or being exposed to a high temperature atmosphere, and is heated and dried. At this time, the drying of the refractory material can be suitably performed by visually observing a change in color of the surface and adjusting a heating temperature and heating time on the basis of the change in tone so as to allow moisture and gas in the refractory material to be sufficiently evaporated. This drying method eliminates temperature measurement using a thermocouple and also eliminates the necessity of skill and experience of an operator.

According to the present invention, the tones of refractory materials can be suitably adjusted depending on the kinds, compositions and amounts of coloring agents used such as organic pigments, inorganic pigments or colored synthetic resins, and accordingly for example, the refractory materials can be distinguished on the basis of the colors thereof in accordance with the use, purpose and the like of the refractory materials.

What is claimed is:

1. A method of drying a lining refractory material for lining of an instrument/apparatus used at a high temperature for a high temperature molten substance or a high temperature atmosphere, said method comprising the steps of:

preparing a colored monolithic refractory material by mixing a powder of a raw material containing ceramics with a coloring agent, and kneading said powder with a liquid and a binder;

covering a portion of an instrument/apparatus being in contact with a high temperature molten substance or exposed to a high temperature atmosphere, with said refractory material;

heating said refractory material; and visually observing a tone of said refractory material, varying with an increase in heating temperature, and adjusting the heating temperature and heating time on the basis of the observed tone, thereby allowing moisture and gas contained in said refractory material to be evaporated.

2. A method of drying a lining refractory material as set forth in claim 1, wherein said coloring agent is an organic pigment.

3. A method of drying a lining refractory material as set forth in claim 1, wherein said coloring agent is an inorganic pigment.

4. A method of drying a lining refractory material as set forth in claim 1, wherein said coloring agent is a colored synthetic resin.

5. A method of drying a lining refractory material as set forth in claim 1, wherein said liquid is water.

6. A method of drying a lining refractory material as set forth in claim 1, wherein said binder is a cement.

7. A method of drying a lining refractory material as set forth in claim 1, wherein said binder is a phosphate.

8. A method of drying a lining refractory material as set forth in claim 1, wherein said binder is a silicate.

9. A method of drying a lining refractory material as set forth in claim 1, wherein said colored monolithic refractory material is applied to the portion for covering.

10. A method of drying a lining refractory material as set forth in claim 1, further comprising the step of shaping said colored monolithic refractory material in a mold prior to the covering step.

* * * * *